United States Patent [19]
Brown, Jr.

[11] 3,767,576
[45] Oct. 23, 1973

[54] LUBRICATING COMPOSITIONS CONTAINING HALOGEN AND ALKOXY, ACYLOXY, OR HYDROXY GROUPS

[75] Inventor: Edgar D. Brown, Jr., Schenectady, N.Y.

[73] Assignee: General Electric Company, Waterford, N.Y.

[22] Filed: Jan. 4, 1971

[21] Appl. No.: 103,820

Related U.S. Application Data

[60] Continuation-in-part of Ser. No. 75,666, Sept. 25, 1970, Pat. No. 3,676,349, which is a division of Ser. No. 666,965, Sept. 11, 1967, abandoned.

[52] U.S. Cl. ............. 252/54.6, 252/54, 260/488 R, 260/614 A, 260/633, 260/634
[51] Int. Cl. ............................................. C10m 1/30
[58] Field of Search ....................... 252/54, 54.6, 58

[56] References Cited
UNITED STATES PATENTS

| | | | |
|---|---|---|---|
| 2,298,636 | 10/1942 | Prutton | 252/54 X |
| 2,335,608 | 11/1943 | Pings | 252/58 |
| 2,683,749 | 7/1954 | Patrick | 252/54 X |
| 3,184,413 | 5/1965 | Furey et al. | 252/58 X |
| 3,260,672 | 7/1966 | MacPhail et al. | 242/54.6 |
| 3,471,405 | 10/1969 | Carlos et al. | 252/54 X |

*Primary Examiner*—Daniel E. Wyman
*Assistant Examiner*—W. Cannon
*Attorney*—Donald J. Voss, Donavon L. Favre, Frank L. Neuhauser, Oscar B. Waddell and Joseph B. Forman

[57] ABSTRACT

Compositions substituted with iodine, with either bromine or chlorine, and with either alkoxy, acyloxy, or hydroxy groups are prepared by adding a mixture of iodine and either bromine or chlorine or IBr or ICl to alpha-olefins in the presence of alcohols, carboxylic acids, or water. Lubricating compositions useful for lubricating high temperature alloys are prepared by adding such compounds to oils of lubricating viscosity.

4 Claims, No Drawings

LUBRICATING COMPOSITIONS CONTAINING HALOGEN AND ALKOXY, ACYLOXY, OR HYDROXY GROUPS

This application is a continuation-in-part of copending application Ser. No. 75,666, filed Sept. 25, 1970 now U.S. Pat. No. 3,676,349, dated 7/11/72, which in turn is a division of application Ser. No. 666,965, filed Sept. 11, 1967 now abandoned.

This invention relates to hydrocarbon compounds substituted with halogen atoms and with alkoxy, acyloxy, or hydroxy groups, and to lubricating compositions containing such substituted hydrocarbon compounds.

As the requirements of modern technology for surfaces which can operate in adverse environments have become more demanding, the metallurgical arts have provided suitable materials, such as the various stainless steels and high temperature metals and alloys. However, the development of lubricating compositions satisfactory to lubricate effectively such new materials has not kept pace with the development of the metallurgical materials. While various halogenated compounds are described in the literature for lubricating difficult to lubricate metallic surfaces and, while many of these halogen-containing compounds perform their lubricating function satisfactorily, the vast majority of such materials decompose in lubricating environments and produce decomposition products which tend to corrode seriously the surfaces being lubricated and the adjacent materials. In my copending application Ser. No. 45,231, filed June 10, 1970 now U.S. Pat. No. 3,639,238 dated 2/1/72 and assigned to the same assignee as the present invention, there are disclosed a class of organosilicon materials containing halogen substituents and either alkoxy, acyloxy or hydroxy substituents. These materials are very useful in performing the lubricating function and resist the tendency to decompose and cause corrosion during lubrication. While these materials are quite satisfactory for many applications, they suffer from a limited solubility in conventional lubricating oils.

The present invention is based on my discovery of a new class of halogenated compounds which have many of the important benefits of various prior art compositions and of the compositions of my copending application and which, in addition, have unlimited solubility in various hydrocarbon lubricating oils.

In particular, the halogenated compounds of the present invention have the formula:

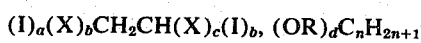

(1)

where X is either bromine or chlorine, R is a member selected from the class consisting of hydrogen, lower alkyl radicals, and lower acyl radicals; the sum of $a$ plus $b$ is equal to 1; $a$ has a value of 0.8 to 1.0; $b$ has a value of 0 to 0.2; $c$ is equal to 1 minus $d$ minus $b'$ and has a value of 0.8 to 0.94; $d$ is equal to from 0.06 to 0.16, and preferably to about 0.12 and $b'$ has a value of 0 to 0.2; and $n$ has a value of from about 2 to 40, and preferably from 4 to 16, inclusive. The present invention is also directed to lubricating compositions comprising a hydrocarbon oil of lubricating viscosity together with an amount of the lubricating additive of formula (1) up to the total amount soluble in the lubricating oil, and preferably a small but effective amount to improve lubricating characteristics of the lubricating oil.

As will be noted from an examination of formula (1), on the average the compositions of the present invention are characterized by containing iodine bonded to the alpha carbon atom of the compound and either bromine or chlorine bonded to both the beta carbon atom and the alpha carbon atom and by a hydroxy, acyloxy or alkoxy group attached to the beta carbon atom. It is, of course, apparent that formula (1) represents an average composition since individual molecules of the composition will have whole numbers of various halogen, hydroxy, alkoxy, or acyloxy substituents.

In formula (1), R has been defined as a member selected from the class consisting of hydrogen, lower alkyl, and lower acyl radicals. By lower alkyl radicals is meant alkyl radicals containing from about one to seven carbon atoms, such as methyl, ethyl, propyl butyl, isobutyl, heptyl, etc. radicals. By lower acyl radicals is meant acyl radicals of aliphatic monocarboxylic acids containing from one to seven carbon atoms which includes, for example, the acyl radicals derived from formic acid, acetic acid, propionic acid, butyric acid, velaric acid, heptanoic acid, etc. In the preferred embodiment of my invention, R is the acetyl radical.

As is apparent from formula (1), the substituted compositions of the present invention can contain from about four to 42 carbon atoms, exclusive of R groups. Preferably, the compositions contain about 12 to 16 carbon atoms, with the preferred specific compound being one which contains a total of 14 carbon atoms, exclusive of R groups. As is apparent from formula (1), the lubricant additives of the present invention can be linear or branched-chain compounds. Preferably, the materials are linear.

Regardless fo whether the products of this invention are linear or branched-chain hydrocarbon compounds, the products are liquid materials when $n$ is 16 or less. With higher molecular weight materials, the products are usually waxy solids.

These products of the present invention are prepared by a reaction involving an alpha-olefin having the formula:

(2)

where $n$ is as previously defined, and a source of iodine radicals, a source of bromine or chlorine atoms, and a source of the hydroxy groups, alkoxy groups, or acyloxy groups which are found in the product of formula (1).

The source of the various halogen substituents in the compounds of formula (1) is a mixture of iodine and bromine, a mixture of iodine and chlorine, iodine monobromide (IBr), or iodine monochloride (IC1). The source of the alkoxy groups in the compounds of formula (1) is either an alcohol or a cyclic ether which will decompose in the reaction environment to provide an alkoxy group. The source of the acyloxy radical is the corresponding aliphatic monocarboxylic acid. The hydroxy group is provided directly from water.

The basic method of preparing products within the scoep of formula (1) in which R is alkyl or acyl involves the mixing of an alpha-olefin within the scope of formula (2) with a solution of the halogen source in the alkoxy source or acyloxy source. Whether the initial halogen source is a mixture of elemental halogens or an iodine monohalide is immaterial for purposes of the present invention, since as soon as the elemental halogens are mixed in the alkoxy or acyloxy source, the iodine monohalide is formed. Thus, when elemental bromine and elemental iodine are mixed in acetic acid, the product is a solution of iodine monobromide in acetic acid. When chlorine is bubbled into a solution of iodine in an alcohol or acid, iodine monochloride is formed.

The material which comprises the source of the alkoxy or acyloxy group of the compound of formula (1) is conveniently employed in a large excess with respect to the amount present in the final product and thus acts as a solvent both for the halogen source and for the final product. Thus, while it is apparent from the value of the subscript $d$ in formula (1) that only about 0.06 to 0.16 moles of the alkoxy or acyloxy source are present per mole of alpha-olefin in the reaction mixture, a large excess of such material is employed, often a several hundred or several thousand-fold excess over that theoretically required to provide the final product.

From an examination of the value of subscripts $a$, $b$, $b'$ and $c$ of formula (1), it is apparent that the products of the present invention contain on the average slightly less than one carbon-bonded iodine and one carbon-bonded bromine or chlorine group per alpha-olefin molecule. While this is the theoretical amount of the halogen-containing material required in the reaction mixture, it is often found to be advantageous to employ an excess of the halogen source material. However, the reaction can be effected with as little as about stoichiometric amounts of the halogen-generating material, but amounts up to 100 to 1,000 per cent excess can be employed. The ratio between the alkoxy or acyloxy source and the halogen source is such that enought of the alkoxy or acyloxy source material is present to act as a solvent for the halogen source. Thus, the amount of alkoxy or acyloxy precursor is generally from about five to 20 parts by weight per part by weight of total halogen source.

The source of acyloxy radicals in the composition of the present invention is the corresponding aliphatic monocarboxylic acid and in the preparation of products within the scope fo formula (1) in which R is acyl, the reaction involves the appropriate alpha-olefin and a solution of the appropriate halogen source in the corresponding acid, For the preparation of products within the scope of the present invention in which R is a lower alkyl radical, the source of alkoxy groups is the corresponding alcohol or appropriate cyclic ether. For practical purposes, the appropriate cyclic ethers are selected from the class consisting of tetrahydrofuran and tetrahydropyran. When tetrahydrofuran is employed as the alkoxy-generating material, the R group is the n-butyl group. When the alkoxy-generating material is tetrahydropyran, the corresponding R group is the n-amyl group.

An unusual and completely unpredictable feature of the method of preparation of the compounds of the present invention is that the reaction between the alpha-olefin of formula (2), the halogen source, and the alkoxy or acyloxy source results in substantially the same proportion of iodine radicals attached to the alpha carbon atom and bromine or chlorine atoms attached to the alpha and beta carbon atoms regardless of the proportion of starting materials. The reaction between the halogen source and the alkoxy or acyloxy sources and the alpha-olefins is not readily understood, but apparently there is an equilibrium in the range of from about 0.06 to 0.16 of the alkoxy or acyloxy radicals per beta carbon atom of the alpha-olefin, with the number of iodine radicals and bromine or chlorine radicals being substantially equal and with substantially all of the iodine radicals being attached to the alpha carbon atom. This means that when the value of $d$ in formula (1) is 0.12, $a$ is equal to 0.94, $b$ is equal to 0.06, $b'$ has the value of about 0.06, and $c$ is equal to 0.82. When $d$ is equal to 0.06, $a$ is equal to 0.97, $b$ is equal to 0.03, $b'$ has the value of about 0.03 and $c$ is equal to 0.91. When $d$ is equal to 0.16, $a$ is equal to 0.02, $b$ is equal to 0.008, $b'$ has the value of about 0.008, and $c$ is equal to 0.076. At intermediate values of $d$, of course, intermediate values of the other subscripts are obtained.

The reaction between the halogen source and the alkoxy or acyloxy source and the alpha-olefin is an exothermic reaction which proceeds without catalyst. Generally, the rate of addition of the various components of the reaction mixture is selected so as to minimize the temperature rise of the reaction mixture so that a temperature increase of no more than about 20° to 25°C from room temperature is obtained. With such a rate of addition, the time required for completion of the reaction ranges from about one hour to three hours. The course of the reaction is readily followed by infrared analysis which shows the gradual disappearance of the peak at 6.1 microns, corresponding to the alpha-olefin group in the starting material and by the appearance of peaks corresponding to the alkoxy or acyloxy groups and several halogen radicals. Upon completion of the reaction, the reaction mixture is stripped of unreacted alcohol, cyclic ether or carboxylic acid and then treated with a moist mixture of sodium bicarbonate to neutralize and remove any impurities. This results in one of the products of formula (1) or formula (2) in which R is an alkyl radical or an acyl radical. Since the product is sensitive to ultraviolet, green, and red light, it is often convenient to add stabilizers to the composition in the form of the free radical acceptors, such as isoprene, $\alpha$-methyl styrene or d-limonene, which adsorb free radicals generated by light induced decomposition. Free radical generation can also be minimized by dyes which absorb light in the above region, such as Calco blue and Tinuvin-P, which are commercial light absorbers.

Products within the scope of formula (1) in which R is hydrogen are prepared by first dissolving the halogen source in a halogenated solvent, such as carbon tetrachloride, trichloroethylene, perchloroethylene, and the like. The solution of the halogen source in the halogenated solvent is then mixed with the alpha-olefin to produce an intermediate product. The rate of mixture of the components of the reaction mixture is again adjusted so that the temperature of the reaction rises no more than about 20° to 25°C above room temperature, which is accomplished in a reaction time of about one to three hours, depending upon the thermodynamics of the reaction system. The amount of halogenated solvent employed in the reaction mixture can vary within wide limits, depending upon the particularly halogenated solvent and the particular halogen source. In general, a satisfactory amount of halogenated solvent is from about 10 to 200 parts per part of the halogen source. The proportions of halogen source to alpha-olefin are adjusted as before to provide at least the amount of halogen required by the stoichiometry of the reaction, but large excesses of the halogen can be employed without adverse results. Upon completion of the rPaction of the solution of the halogen source in the halogenated solvent with the alpha-olefin, the reaction mixture is then washed with voluminous quantities of water, such as a 10 to 20 volume excess of water. After washing, water is separated from the reaction mixture by decanting the organic phase from the aqueous phase, the organic phase is then stripped of solvent and the resulting product is treated with moist sodium thiosulfate and sodium bicarbonate to further purify the reaction mixture. The final product is then treated with free radical acceptors and dyes to provide a stable product.

The halogenated products within the scope of formula (1) are useful as additives for oils of lubricating viscosity to improve the ability of such oils to lubricate difficult to lubricate surfaces, such as stainless steel and high temperature metals and alloys. The lubricating oils to which the products of the present invention are added include any type of lubricating oils ranging from gasoline and kerosene to other common lubricating oil materials. The preferred class of lubricating oils are the hydrocarbon oils.

Suitable hydrocarbon oils employed in preparing the compositions of the present invention are those occurring naturally in petroluem, and particularly are those useful for the lubrication of machinery. For example, neutral oils having a viscosity between about 50 SUS at 100°F and 2,000 SUS at 100°F, or bright stocks having a viscosity between 90 and 300 SUS at 210°F, but any petroluem product which is required to have oiliness in certain uses can be improved in this property by adding the halogenated materials of formula (1). The preferred petroluem hydrocarbons are those boiling above 300°F and especially preferred are those boiling above 500°F at atmospheric pressure.

For many of the usual applications of the lubricating compositions of this invention, conventional lubricating oils, cutting oils, metal working oils, hydraulic fluids, pneumatic equipment oils, spindle oils, gear oils, and the like, can be used as the base lubricating fluid. It is contemplated in one of the preferred embodiments of my invention that the lubricating oils include straight mineral lubricating oils or distillates derived from paraffinic, naphthenic, asphaltic, or mixed base crudes or, if desired, various blended oils can be employed as well.

In preparing the lubricating compositions of the present invention which contain the substituted compounds of formula (1) and an oil of lubricating viscosity, the halogen-substituted compound is merely dissolved or dispersed in the lubricating oil to form the desired composition. This solution or dispersion can be effected either before or after materials, such as light stabilizers and free radical absorbing agents, are added.

In general, the amount of compound of formula (1) which is added to the lubricating oil varies within wide limits. The amount of substituted compound of formula (1) is a function of the particular oil of lubricating viscosity. As mentioned earlier, the compounds of formula (1) have unlimited solubility in hydrocarbon lubricating oils. For some very severa lubricating applications, such as in the machining of metals, such as titanium, it is desirable to employ relatively high concentrations of the additive of the present invention, for example, from about 30 to 50 per cent by weight based on the weight of the oil of lubricating viscosity. However, one of the beneficial features of the present invention is that excellent lubricating characteristics are obtained even when only small amounts of the halogenated compound of formula (1) are employed. Such small amounts range down to about 0.1 part by weight of the substituted compound of formula (1) per 100 parts of the lubricating oil base fluid. Thus, the full range of lubricating compositions within the scope of the present invention is from about 0.1 to 100 parts by weight of the halogenated compound of formula (1) per 100 parts by weight of the hydrocarbon base oil. Those skilled in the art will have no difficulty in determining the amount of compound of formula (1) to incorporate in the composition of the present invention.

In addition to the halogenated compound of formula (1) and the lubricating oil, the lubricating compositions of the present invention also contemplate the addition of other additives, such as wetting agents, fillers, thickeners and dyes to the base lubricating fluids. The various fillers added to the lubricating compositions are used to obtain grease-like consistency and are generally non-abrasive fillers, such as silica gel, carbon black, diatomaceous earth, graphite, etc.

Compositions comprising the halogenated compound of formula (1) and the base lubricating oil can be used to lubricate a plurality of pairs of surfaces which move with respect to each other. These compositions are particularly useful in the lubrication of surfaces which heretofore have been almost impossible to lubricate by conventional methods. Of particular utility is the lubrication of two solid surfaces moving relative to each other when one of the surfaces is a metal which is at least 50 per cent titanium. The other surface can be a metal used for fabricating structural shapes, e.g., iron, molybdenum, silver, copper, beryllium, tungston, magnesium, titanium, zirconium, chromium, nickel, cobalt, aluminum, tin, etc., and various metal compositions, e.g., high and low temperature alloys, of which typical examples are steels, brasses, the various alloys of magnesium, cobalt, nickel, zinc, chromium, zirconium, beryllium, aluminum, iron, etc. In addition to lubricating surfaces which include titanium, the compositions of the present invention are also useful as extreme pressure lubricating compositions for pairs of metal surfaces moving relative to each other when neither of the surfaces contains titanium. Thus, these compositions are useful for lubricating any combination of two of the surfaces previously described. The present invention is especially useful for the lubrication of heat resistant alloys, such as those commercially available under the names of Rene 41, Inconel 718, Monel K, Casteloy C, and Udimet, all of which are nickel-based alloys of published composition.

The amount of lubricating composition within the scope of the present invention used to lubricate moving surfaces can vary within wide limits, and are within the skill of those having knowledge of the lubricating art. The amount of lubricant is merely selected to insure that there is a lubricating supply of the lubricant composition between the surfaces which are to be lubricated.

The following examples are illustrative of the preparation of the halogenated compounds of formula (1), of the preparation of lubricating compositions by the addition of such halogenated compounds to lubricating oils, and of the method of lubricating surfaces with such compositions. These examples are illustrative only and are not intended for purposes of limitation. All parts are by weight.

In the examples which follow, lubricating compositions of the present invention, as well as various prior art and control materials, are evaluated by one or more different methods. One measure of the lubricating characteristics of the metarial is its wear in the conventional Four Ball Wear test. In this test, as applied in the present invention, three rigidly clamped ½ inch metal balls are clamped into a metal cup and are covered with the lubricating composition under evaluation. A fourth metal ball of the same diameter is pressed into contact with the three stationary balls under a load of 30 kilograms and rotates at a speed of 600 rpm at ambient temperature for one hour. The contact points between the rotatable ball and the three stationary balls grow to circular scars as wear progresses. The average diameter of these scars in millimeters after the one hour run is taken as a measure of wear. The better the lubricity of the fluid, the lower is the wear scar.

In another test designed to measure extreme presure lubricating characteristics of various materials, a minimum seizure load is determined. In particular, this test is run on a Falex lubricant testing machine which is described in an article by Victor A. Ryan in Lubrication Engineering, Sept. 1946, pages 102 to 104. Essentially, the test performed by the machine involves rotating a shaft between two V-blocks as pressure is applied to the bearing surfaces. A measure of the lubricating characteristics of the lubricant under evaluation is obtained by slowly increasing the pressure applied to the bearing surfaces as described in the article. The pressure at which the bearing surfaces seize the rotating shaft is recorded. The higher the pressure, the better is the material under test as a lubricant. In applying this Falex test, the rotating shaft and the V-blocks are both composed of the same material.

EXAMPLE 1

To a reaction vessel was added 400 parts of acetic acid and 80 g. of bromine were dissolved therein. To the resulting solution were added 120 parts iodine and the reaction mixture was stirred until the iodine went into solution and iodine monobromide was formed. To this reaction mixture was slowly added, with stirring, 196 parts of tetradecene and the rate of reaction was controlled to keep the temperature below 48°C. The reaction was effected over a period of about three hours. The reaction mixture was then placed under a vacuum of 15 millimeters and excess acetic acid was removed by heating to 130°C. After the reaction, the reaction mixture was tripped at 65°C at about 20 mm. to remove any more unreacted glacial acetic acid. The reaction mixture was then cooled, washed with water, dried over sodium sulfate and then filtered through a mixture of diatomaceous earth and charcoal to produce a substituted tetradecane having the formula:

$(I)_{0.94}(Br)_{0.06}CH_2CH(Br)_{0.84}(I)_{0.05}(OOCH_3)_{0.11}C_{12}H_{25}$.

Chemical analysis of this product showed the presence of about 30 per cent iodine, about 20 per cent bromine, and about 1.8 per cent acetoxy groups. Infrared analysis showed a peak at 8.2 microns corresponding to the iodine group, a peak at 8.3 microns corresponding to the bromine group, and a peak at 5.7 microns corresponding to the acetate radical.

Lubricating compositions were prepared by adding various amounts of this material to a white naphthenic mineral oil and determining the wear scar in the Four Ball test using both 302 stainless steel balls and type 304 stainless steel balls and in the Falex seizure test using type 302 stainless steel components. In the table below are listed the compositions prepared by adding various parts of the substituted tetradecane to 100 parts of the mineral oil, the wear scar in millimeters, andthe Falex seizure load.

TABLE I

| Parts Additive per 100 Parts Mineral Oil | Wear Scar 302 Stainless (m.m.) | Wear Scar 304 Stainless (m.m.) | Seizure Load (psi) |
|---|---|---|---|
| None (Control) | 5.0 | 5.0 | 200 |
| 0.2 | 1.2 | 1.6 | 2000 |
| 2.0 | 0.8 | 0.8 | 4000 |
| 18.0 | 0.6 | 0.6 | 4000 |

As shown by the above Table I, with the mineral oil containing no additive, the wear scar was unacceptably high with both 302 stainless steel and 304 stainless steel and the maximum seizure load was unacceptably low in the Falex seizure load test. On the other hand, with the additive of the present invention in compositions of the present invention with the additive present at levels of 0.2 to 2.0 and 18.0 parts per 100 parts of mineral oil, the lubricating characteristics of the mineral oil were dramatically improved.

EXAMPLE 2

To a reaction vessel containing 2260 parts of glacial acetic acid was added 490 parts of bromine and the reaction mixture was stirred until the bromine dissolved. Thereafter, 775 parts of iodine were added and the reaction mixture was again stirred until the iodine went into solution. At this time, the slow addition of 960 parts of tetradecene-1 was begun. The rate of addition was controlled so as to maintain the reaction vessel temperature below about 50°C which required about three hours to be spent on the addition. At the end of this time, the reaction mixture was cooled to room temperature and then washed with voluminous amounts of water to remove unreacted acetic acid and other water-soluble products and to produce a viscous, dark-red liquid. This material was dissolved in 2000 parts of carbon tetrachloride, the resulting solution was again washed with water, and then treated with 10 parts of moist sodium thiosulfate and six parts of moist sodium bicarbonate. The carbon tetrachloride solution was then dried over sodium sulfate, carbon tetrachloride was stripped from the reaction mixture and the product was filtered through diatomaceous earth to produce a substituted tetradecane having the formula:

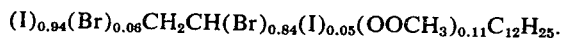
$(I)_{.97}(Br)_{.03}CH_2CH(Br)_{.91}(I)_{0.03}(OOCCH_3)_{.06}C_{12}H_{25}$ The identity of the above material is confirmed by analysis which shows the presence of about 30 per cent iodine, 19 per cent bromine, and 0.9 per cent acetoxy groups. The identity is further confirmed by infrared analysis which shows the bands mentioned in Example 1, corresponding to iodine, bromine and the acetoxy group. A lubricating composition is prepared by dissolving 2 parts of the above product in 100 parts of naphthenic mineral oil and the composition has a wear

EXAMPLE 3

To a reaction vessel was added 900 parts propionic acid in which was dissolved 155 parts iodine monochloride. To the resulting solution was slowly added 112 parts of octene-1 while the reaction mixture was maintained at a temperature of 10° to 15°C with external cooling. About three hours were allowed for the addition. At the end of this time, the reaction mixture was washed several times with water to remove unreacted propionic acid and other water-soluble products. The resulting organic layer was decolorized by mixing with six parts of moist sodium thiosulfate and four parts sodium bicarbonate. The resulting solution was again washed with water and the organic layer was separated by decantation, dried over sodium sulfate, and stabilized against decomposition by the addition of 0.1 part of d-limonene, a free radical acceptor, and 0.01 part Calco blue dye. The resulting product had the formula:

$(I)_{.92}(Cl)_{.08}CH_2CH(Cl)_{.77}(I)_{0.07}(OOCC_2H_5)_{.16}C_6H_{13}$ .

The identity of the product is confirmed by analysis which shows the presence of approximately 47 per cent iodine, 12 per cent chlorine, and 4.3 per cent propionate groups. Infrared analysis further confirms the identity by showing peaks for the iodine radicals, the chlorine atoms, and the ester groups. A lubricating composition is prepared by adding five parts of this composition to 100 parts of a mineral lubricating oil and evaluating the composition in the Falex seizure load test. The load to seizure is in excess of 2000 psi.

EXAMPLE 4

To a reaction vessel was added 450 parts ethyl alcohol and 80 parts of bromine were added thereto. Subsequently, 127 parts of iodine were added and the mixture was stirred until a single phase solution resulted. The reaction mixture was then cooled to 5°C and over a three-hour period, 84 parts of hexene-1 were added while the reaction mixture was kept at a temperature of 5° to 15°C. The reaction mixture was then warmed to 35°C, washed with water, and the organic layer was separated from the aqueous layer. The organic layer was mixed with four parts sodium thiosulfate, three parts of sodium bicarbonate, and 0.5 part water to decolorize the product. The product was then dried over sodium sulfate and filtered through diatomaceous earth to produce 220 parts of a product having the formula:

$(I)_{.94}(Br)_{.06}CH_2CH(Br)_{.83}(I)_{.05}(OC_2H_5)_{.12}C_4H_9$ .

Analysis of this material showed the presence of about 42 percent iodine, 26 percent bromine, and 2 percent ethoxy groups. The identity of the material was further confirmed by infrared analysis which showed a peak at 8.2 microns corresponding to the iodine group, a peak at 8.3 microns corresponding to the bromine group, and a peak at 10.4 microns corresponding to the ethoxy radical. This product was stabilized by adding thereto 0.05 part of d-limonene and 0.005 part Calco blue dye. A lubricating composition was prepared by adding 6 parts of this product to 100 parts of mineral spirits and the lubricating characteristics of the product were evaluated in the Four Ball Wear test which showed a wear scar of less than 0.9 mm. using type 302 stainless steel balls.

EXAMPLE 5

Following the general procedure of Example 4, a solution of 80 parts of bromine in 900 parts of ethyl alcohol was added to a reaction vessel and 127 parts of iodine was subsequently added and the reaction mixture was stirred until a uniform solution was obtained. Over a two hour period, 196 parts of tetradecene-1 was slowly added to the reaction mixture while its temperature was maintained between 30° and 40°C. After the addition was completed, the excess ethanol and unreacted volatile materials were stripped at a temperature of 95°C and 20 mm. The resulting product was washed with water to produce 307 parts of a substituted hydrocarbon having the formula:

$(I)_{.92}(Br)_{.08}CH_2CH(Br)_{.78}(I)_{.06}(OC_2H_5)_{.16}C_{12}H_{25}$ .

Analysis of the product showed the presence of about 30 percent iodine, 18 percent bromine, and 1.8 percent ethoxy groups. Infrared analysis showed peaks corresponding to the iodine radical, the bromine radical, and the ether group. 16 parts of this product were dissolved in 84 parts of white mineral oil and the resulting product was evaluated in the Four Ball Wear test. With type 304 stainless steel balls, the wear scar was less than 0.6 mm.

EXAMPLE 6

To a reaction vessel was added 240 parts isopropanol, 40 parts bromine, and 63 parts iodine and the mixture was stirred until a homogeneous solution had been formed. The reaction mixture was then cooled to 7°C and maintained at this temperature for a period of three hours while 98 parts of tetradecene-1 were slowly added. The resulting product was washed with water and a precipitate was filtered from the raction mixture with diatomaceous earth and the organic layer was decanted and dried over sodium sulfate and the reaction mixture was filtered again through diatomaceous earth to produce 117 g. of a product having the formula:

$(I)_{.96}(Br)_{.04}CH_2CH(Br)_{.88}(I)_{.04}[OCH(CH_3)_2]_{.08}\ C_{12}H_{25}$

Analysis of this product showed the presence of approximately 30 percent iodine, 19 percent bromine, and 1.2 percent isopropyl groups. The identity of the product was further confirmed by infrared analysis which showed the presence of the iodine groups, the bromine groups, and the ether linkages. A lubricating composition was prepared by adding 10 parts of this material to 90 parts of a naphthenic white mineral oil and the resulting product was evaluated in the Falex seizure load test. The load required for seizure was in excess of 4000 psi.

EXAMPLE 7

To a reaction vessel was added 700 parts tetrahydrofuran and 80 parts of bromine were dissolved therein. 127 parts of iodine were added to the resulting solution and were mixed until all of the iodine had dissolved. At this time, 200 parts of tetradecene-1 were slowly added at a rate sufficient to maintain the temperature of the reaction mixture at 55°C. After the addition was completed, the reaction mixture was refluxed for one hour at 80°C and volatiles were stripped from the reaction mixture by raising the temperature to 90°C and reducing the pressure to 15 mm. The resulting product was washed with water and the organic layer was separated and dried over sodium sulfate and filtered through diatomaceous earth to produce a product having the formula:

$$(I)_{.92}(Br)_{.08}CH_2CH(Br)_{.77}(I)_{.07}(OC_4H_9)_{.16}C_{12}H_{25}.$$

Analysis of this material showed the presence of about 29 percent iodine, 18 percent bromine, and 2.9 percent butoxy groups. Infrared analysis confirmed the identity of the product. A lubricating composition was prepared by adding three parts of this composition to 97 parts of a naphthenic mineral oil and the resulting composition was examined in the Four Ball Wear test. With type 302 stainless steel balls, a wear scar of 0.94 mm. was obtained. With balls made of titanium, a wear scar of 2.28 mm. was obtained when another portion of the material was diluted with equal parts of mineral oil. When an attempt is made to measure the wear scar of titanium in mineral oil without additives in the Four Ball Wear test, it is impossible to run the test, since the mineral oil does not lubricate sufficiently to permit smooth operation of the equipment and wear is catastrophic.

EXAMPLE 8

To a reaction vessel was added 200 g. of carbon tetrachloride and 47 g. of iodine monobromide was dissolved therein. At this time, 45 parts of tetradecene-1 was slowly added to the reaction mixture keeping the temperature below 70°C. The reaction mixture was cooled and mixed with an equal volume of water and an emulsion formed. An equal volume mixture of hexane and toluene was added to the emulsion to break the emulsion and dissolve the organic layer. The aqueous layer was then decanted and all solvent was stripped from the reaction mixture at a temperature of about 70°C and a pressure of 15 mm. The product was then dried over sodium sulfate and filtered through diatomaceous earth to produce a product having the formula:

$$(I)_{.94}(Br)_{.06}CH_2CH(Br)_{.83}(I)_{.05}(OH)_{.12}C_{12}H_{25}.$$

Analysis of this product showed the presence of approximately 30 percent iodine, 19 percent bromine, and 0.5 percent hydroxyl groups. The identity of the product was confirmed by infrared analysis which showed peaks corresponding to iodine and bromine as previously mentioned and a peak at 2.7 microns corresponding to the hydroxyl group. A lubricating composition was prepared by dissolving five parts of this material in 95 parts of white mineral spirits to produce a lubricating composition which showed a wear scar of less than 0.8 mm. with type 302 stainless steel.

While the foregoing examples have illustrated many of the embodiments of my invention, it is understood that my invention relates broadly to substituted compounds of the type shown in formula (1) containing iodine on the alpha carbon atom and either bromine or chlorine on both the alpha and beta carbon atoms and with an alkoxy, an acyloxy or a hydroxy group also attached to the beta carbon atom. These substituents are present in the amounts shown in formula (1). My invention is also directed to lubricating compositions comprising an oil of lubricating viscosity containing an amount of the composition of formula (1) effective to lubricate the surface whose lubrication is required.

What I claim is:

1. A lubricating composition comprising a solution of lubricity improving amounts of a mixture of halogenated compounds represented by the average formula:

$$(I)_a(X)_b CH_2 CH(X)_c(I)_{b'}(OR)_d C_n H_{2n+1},$$

in lubricating amounts of a hydrocarbon oil of lubricating viscosity where X is either bromine or chlorine, R is a member selected from the class consisting of hydrogen, lower alkyl radicals, and lower acyl radicals; the sum of $a$ plus $b$ is equal to 1; $a$ has a value of 0.8 to 1.0; $b$ has a value of 0 to 0.2; $c$ is equal to 1 minus $d$ minus $b'$ and has a value of 0.8 to 0.94; $d$ is equal to from 0.06 to 0.16; $b'$ has a value of 0 to 0.2; and $n$ has a value of from about 2 to 40 inclusive.

2. A lubricating composition of claim 1 further characterized by R being a lower acyl radical.

3. A composition of claim 1 further characterized by X being bromine and R being an acetyl radical.

4. The composition of claim 1 further characterized by the hydrocarbon oil of lubricating viscosity being a mineral lubricating oil.

* * * * *